C. GLOVER.
GAGE.
APPLICATION FILED OCT. 12, 1916.
1,234,656.
Patented July 24, 1917.
2 SHEETS—SHEET 1.
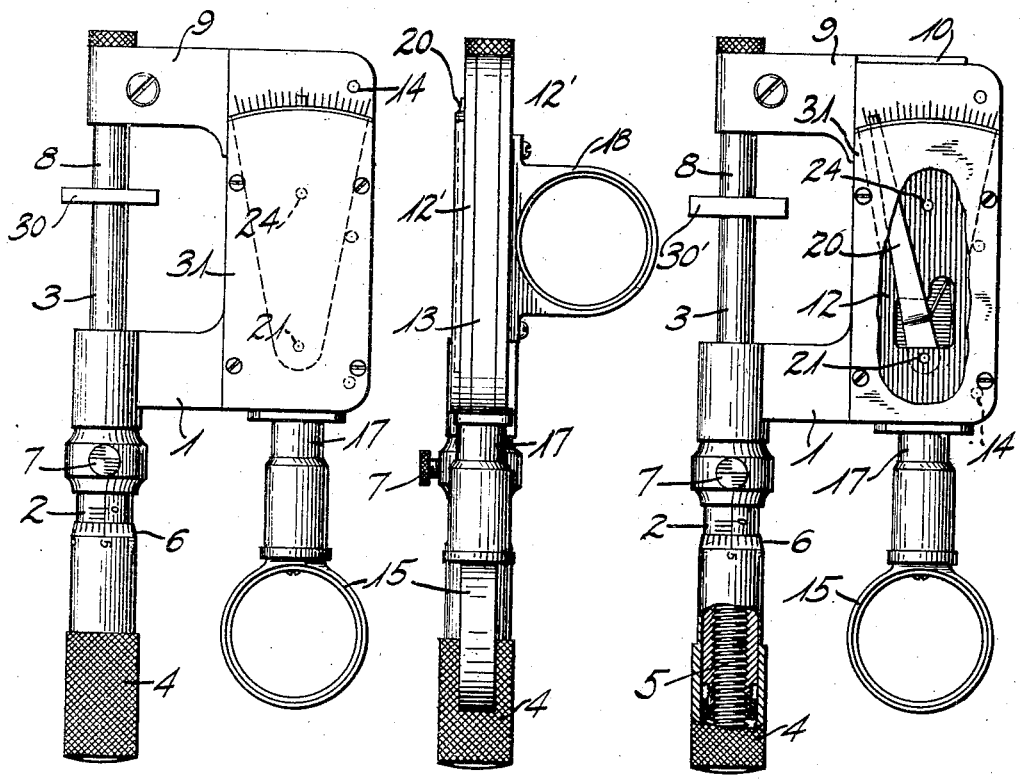
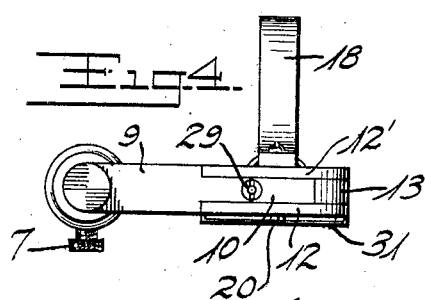
Charles Glover, Inventor
By his Attorneys C. GLOVER.
GAGE.
APPLICATION FILED OCT. 12, 1916.
1,234,656.
Patented July 24, 1917.
2 SHEETS—SHEET 2.
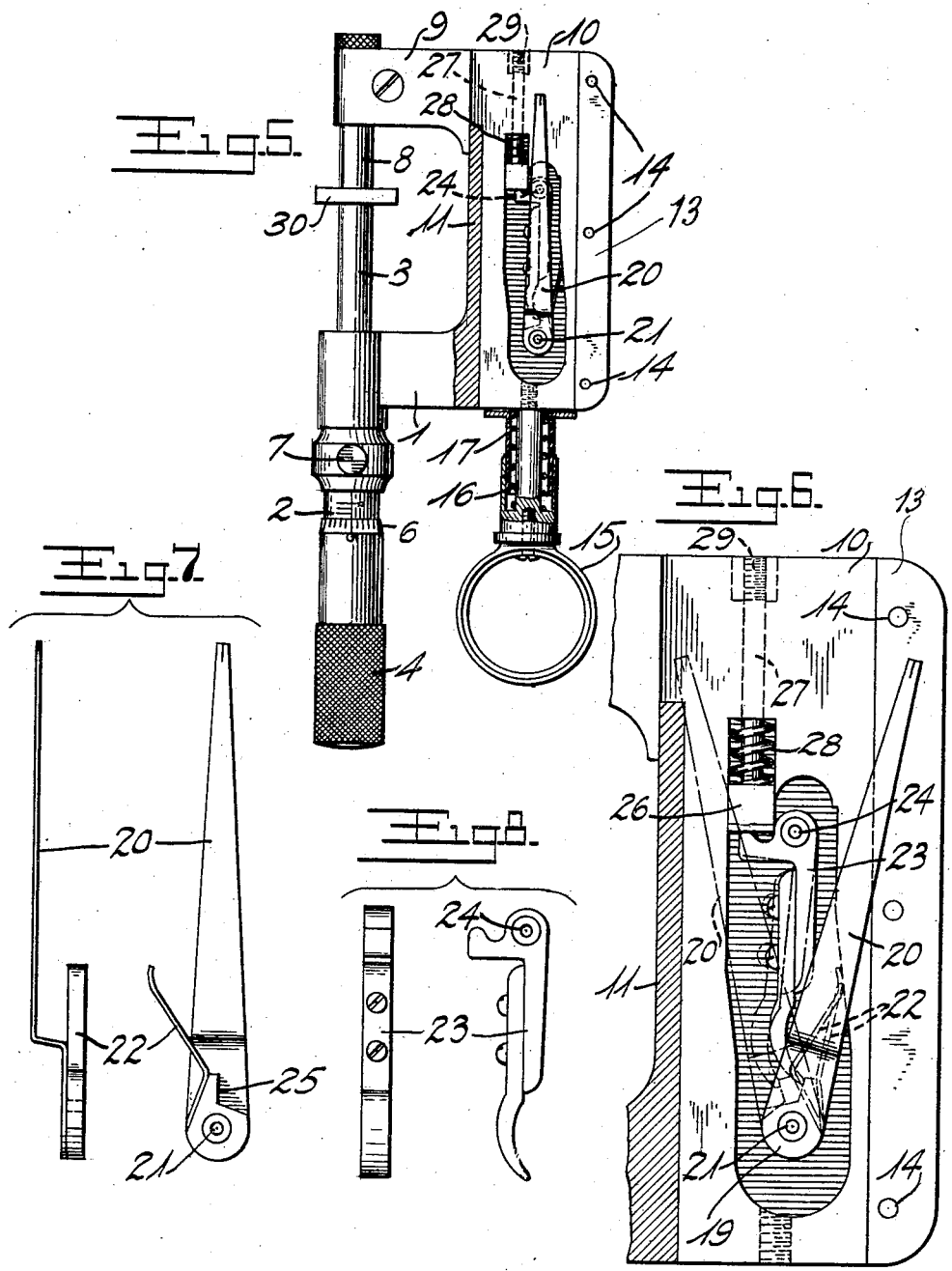
Charles Glover, Inventor
By his Attorneys
Bartlett & Brownell

UNITED STATES PATENT OFFICE.

CHARLES GLOVER, OF NEW BRITAIN, CONNECTICUT.

GAGE.

1,234,656. Specification of Letters Patent. Patented July 24, 1917.

Application filed October 12, 1916. Serial No. 125,154.

*To all whom it may concern:*

Be it known that I, CHARLES GLOVER, a citizen of the United States, residing at New Britain, county of Hartford, State of Connecticut, have invented certain new and useful Improvements in Gages, of which the following is a full, clear, and exact description.

My invention relates to improvements in gages and has for its object to provide a new and improved gage for measuring small thicknesses or diameters. It further has for its object to provide a new and improved gage for measuring small variations in thicknesses or diameters. It further has for its object to provide a gage for measuring small variations in diameters or thicknesses in which the spaces between the gage terminals can be set by a micrometer screw and can also be changed by a direct thrust.

The following is a description of an embodiment of my invention, reference being had to the accompanying drawings, in which—

Figure 1 shows in side elevation a gage embodying my invention in use to determine the thickness of a block between the faces of its abutments;

Fig. 2 is a rear elevation of the same;

Fig. 3 is a side elevation with a part of the face plate being broken away and used to measure a block of different thickness than in Fig. 1 without changing the micrometer adjustment;

Fig. 4 is an end view of the gage;

Fig. 5 is a side elevation of the gage partly in section, so as to show the internal parts thereof;

Fig. 6 is an enlargement of a portion of Fig. 5;

Fig. 7 is a side elevation and plan view of the indicating lever or pointer of the gage, and Fig. 8 is a side elevation and plan view of a lever for actuating said pointer.

Referring more particularly to the drawings, 1 is a frame having an arm carrying a graduated shank 2 in which is mounted a movable abutment 3 connected to the knurled thumb turn 4. The movable abutment is provided with screw-threads 5 engaging internal screw-threads of the shank and the upper end of the knurled thumb piece is provided with graduations 6, while a set screw 7 is provided for holding the thumb turn and movable abutment in any adjusted position. These features are the ordinary features of a micrometer gage such as has long been in common use. Opposing the movable abutment 3 is another movable abutment 8, rigidly mounted upon an arm 9 connected to a slide 10 carried between the front portion 11 and the side walls 12—12' of the frame and a back piece 13. The body of the slide 10 is out of alinement with and parallel to the axes of the abutments 3 and 8. The back piece 13 is held in place by screws 14. The frame and slide with their arms constitute a U-shaped structure. Connected to the bottom end of the slide is an actuating member 15 provided with a compression spring 16 housed within a suitable bushing 17 bearing against the frame, over which bushing a sleeve carried by the actuating member 15 slides so as to inclose the spring 16. Connected to the rear side of the frame is a finger piece 18. This finger piece is adapted to receive one of the fingers while the ring of the actuating member 15 is adapted to receive the thumb of the same hand. Upon pressing these two parts together, the abutment 8 by a direct thrust is caused to move away from the abutment 3 and upon release of the pressure the spring 16 draws the abutment 8 toward the abutment 3. The slide 10 is provided with an opening within which lies the lower end 19 of a pointer 20, said lower end being mounted upon a pivot 21 carried by the side plates 12—12'. This pointer carries a spring 22, which bears against one wall of the opening in the slide 10 and tends to move the pointer 20 to the left. Mounted in this same opening is a lever 23 pivoted to the side plates 12—12' at 24. The lower end of this lever engages a face 25 upon the pointer, while the other end of the lever which is at approximately right angles to said lower end, engages an adjustable block 26 carried by the slide 10. The lever 23 and pointer 20 constitute a compound lever whose power arms are much shorter than their load arms. The adjustable block 26 lies in a recess in the plate 10 and is provided with a shank 27 surrounded by a spring 28 which tends to move the block 26 downward. A nut 29 in a recess in the upper part of the slide 10 engages a screw-threaded portion of the shank 27 and by turning this nut the position of the block 26 can be varied, so as to adjust the parts 20 and 23. The upper end of the pointer rides over the face plate 12 of the frame and upon that face plate beneath the path of the movement of said pointer are graduation marks constituting a scale. These graduation marks as shown correspond to the graduation marks 6 on the thumb turn, i. e., are so spaced that a movement of the abutment 3 corresponding to one graduation mark 6 is equal to a movement of abutment 8 which corresponds to the movement of the pointer 20 from one of its graduation marks to the next. The pointer 20 is protected by a cover plate 31, secured to the frame and provided with a recess as shown in dots in Fig. 1 and through the mouth of which the pointer 20 protrudes as shown in Fig. 4. The pivot 24 is between the pivot 21 and said scale and both of said pivots are located between the longitudinal edges of the slide which engage the portion 11 of the frame and the back piece 13 and constitute guides. These longitudinal edges, together with the faces of the slide co-act with surfaces of the frame to define the path of movement of the slide.

In using this gage for determining whether pieces of material conform to a given standard, the gage is first adjusted so that when the abutments 3 and 8 are in engagement, the pointer 20 will register with its central graduation mark, this adjustment being made by the nut 29. This adjustment would ordinarily be made before the device leaves the manufacturer. With the instrument in this condition, the abutments 3 and 8 are separated by turning the thumb turn 4 to admit a block 30 of the standard thickness, to which it is desired to have other blocks conform, and the abutment 3 is then moved toward the abutment 8 by turning the thumb turn until the pointer 20 coincides with its central graduation mark. The ring 15 is then moved toward the ring 18, so as to separate the abutments 3 and 8 for removal of the standard block, and in place of the standard block a second block 30' is inserted, as shown in Fig. 3. If this block is of greater thickness than the first block, the pointer 20 will stand in a position on the left hand side of the scale, as indicated in Fig. 3, its position being determined by the increase of thickness, the variation indicated in Fig. 3 being about nine-thousandths of an inch. Other blocks whose variation from the standard are to be determined are then inserted one after another with the result that it can be quickly determined whether they are of the standard thickness or whether they vary therefrom. If they are thicker, the pointer 20 will stand to the left of the center, as before stated, and if they are thinner, to the right thereof.

The position of the pointer 20 depends upon the position of the slide 10, which through the block 26 determines the position of the lever 23, which in turn determines the position of the pointer 20, the spring 22 always tending to move the pointer 20 to the left. Inasmuch as the pointer is of considerable length and its lever arm is short, and inasmuch as the load arm of the lever 23 is long and its power arm short, a very slight movement of the slide 10 produces a large movement of the end of the pointer 20, being greatly multiplied. The pointer 20 is therefore very sensitive and yet definite in its action and indicates directly and clearly any variation of the block to be measured from the standard.

The slide 10 and pointer 20 may also be used for measuring slight thicknesses up to ten thousandths. For this purpose the thumb turn is moved until the abutments 3 and 8 engage and the pointer stands in its central position. The members 15 and 18 are then drawn together, moving the abutments apart, and the thin body inserted. When the abutments 3 and 8 are in engagement with the sides of the thin body, the pointer will indicate the thickness of that thin body.

As will be evident to those skilled in the art, my invention permits of various modifications without departing from the spirit or the scope thereof.

What I claim is:

1. In a gage the combination of a frame member, a slide member mounted thereon said two members each having a body portion and an arm projecting laterally therefrom, and being disposed so as to form a U-shaped structure having its arms relatively movable, the portion connecting said arms being composed in part of said frame member and in part of said slide, means for moving said slide relatively to said frame member, a retracting spring acting on said slide and frame to restore the same to normal position, indicating mechanism located in the portion of said U-shaped structure which connects said movable arms and responsive to relative movements of said frame and slide members, and opposing abutments carried by said arms.

2. In a gage the combination of a frame member, a slide mounted thereon and having guiding longitudinal edges, opposing abutments carried by said two members respectively, and a compound indicating lever composed of two lever elements having their fulcrums carried by said frame member and located between the guiding longitudinal edges of said slide member, the power arm of said first lever element being at approximately a right angle to its load arm, and actuated in one direction by said slide member.

3. In a gage the combination of a frame member, a slide mounted thereon and having guiding longitudinal edges, opposing abutments carried by said two members respectively and a compound indicating lever composed of two lever elements having their fulcrums carried by said frame member and located between the guiding longitudinal edges of said slide member, the power arm of said first lever element being at approximately a right angle to its load arm and actuated in one direction by said slide member, said frame member carrying a scale and the fulcrum of said first member being between said scale and the fulcrum of said second lever member.

4. In a gage, the combination of a frame carrying an abutment, a slide carried by said frame and provided with an abutment opposing said first abutment, the body of said slide being out of alinement with and parallel to the axes of said abutments, manual means connected to said slide for moving the same in one direction so as to move said abutments apart, a spring for retracting said slide when so moved, a compound indicating lever carried by said frame and actuated by said slide, the several elements of said compound lever having relatively short power arms and long load arms, and an adjustable block carried by said slide and engaging the first power arm of said compound lever.

5. In a gage, the combination of a frame carrying an abutment, a slide carried by said frame and provided with an abutment opposing said first abutment, manual means connected to said slide for moving the same in one direction, a spring for retracting said slide when so moved, a compound indicating lever carried by said frame and actuated by said slide, the elements of said compound lever having relatively short power arms and long load arms, an adjustable block carried by said slide engaging the first power arm of said compound lever.

CHARLES GLOVER.

Copies of this patent may be obtained for five cents each, by addressing the "Commissioner of Patents, Washington, D. C."